US009783124B2

(12) United States Patent
Catlin et al.

(10) Patent No.: US 9,783,124 B2
(45) Date of Patent: Oct. 10, 2017

(54) MOBILE DEVICE HOLDER FOR USE IN A VEHICLE

(71) Applicant: Shanghai Yanfeng Jinqiao Automotive Trim Systems Co., Ltd., Plymouth, MI (US)

(72) Inventors: Michael Robert Catlin, Holland, MI (US); Randal John VanHoof, Zeeland, MI (US)

( * ) Notice: Subject to any disclaimer, the term of this patent is extended or adjusted under 35 U.S.C. 154(b) by 0 days.

(21) Appl. No.: 15/423,357

(22) Filed: Feb. 2, 2017

(65) Prior Publication Data

US 2017/0144613 A1    May 25, 2017

Related U.S. Application Data

(63) Continuation-in-part of application No. PCT/US2015/044074, filed on Aug. 6, 2015.
(Continued)

(51) Int. Cl.
*B60R 11/02* (2006.01)
*H04M 1/04* (2006.01)
(Continued)

(52) U.S. Cl.
CPC ........ *B60R 11/0241* (2013.01); *H04B 1/3877* (2013.01); *B60R 2011/0007* (2013.01);
(Continued)

(58) Field of Classification Search
CPC .................... H04B 1/38; H04B 1/3877; H04B 2011/0007; H04B 1/3822; B60R 11/00; B60R 11/0241; B60R 11/02; H04M 1/04
See application file for complete search history.

(56) References Cited

U.S. PATENT DOCUMENTS 5,493,703 A * 2/1996 Yamashita ........... H04B 1/3877
379/454
5,787,167 A * 7/1998 Anderson ................ H04M 1/11
379/446
(Continued)

FOREIGN PATENT DOCUMENTS

EP          2581270 A1    4/2013
JP      2013203244 A   10/2013
(Continued)

OTHER PUBLICATIONS

International Preliminary Report on Patentability and Written Opinion for International Application No. PCT/US2015/044074 dated Feb. 16, 2017.
(Continued)

*Primary Examiner* — Blane Jackson
(74) *Attorney, Agent, or Firm* — Husch Blackwell LLP

(57) ABSTRACT

A vehicle console with a mobile device holder is disclosed. A mobile device holder for use in a vehicle is also disclosed. The mobile device holder may comprise a base having a compartment with an opening and a cover connected to the base and configured to move relative to the compartment from a closed position covering the opening to an open position where an underside of the cover is displayed. The cover may include a cradle on the cover underside configured to hold and display one or more mobile devices. The cradle may include an opening to allow a cable to be connected to one mobile device(s). The compartment may include an electronic port connectable to the cable. The mobile device holder may comprise a bin connected to the compartment and configured for holding the cable. The bin may include a cover member configured for providing access to the bin.

18 Claims, 9 Drawing Sheets

Related U.S. Application Data

(60) Provisional application No. 62/033,923, filed on Aug. 6, 2014.

(51) Int. Cl.
  *H04B 1/38* (2015.01)
  *H04B 1/3877* (2015.01)
  *B60R 11/00* (2006.01)

(52) U.S. Cl.
  CPC ............... *B60R 2011/0075* (2013.01); *B60R 2011/0094* (2013.01)

(56) References Cited

U.S. PATENT DOCUMENTS

| | | | | |
|---|---|---|---|---|
| 5,896,564 A * | 4/1999 | Akama | ............... | B60R 11/0241 379/455 |
| 6,279,891 B1 * | 8/2001 | Jaeger | ............... | B65H 39/055 270/52.14 |
| 8,783,752 B2 * | 7/2014 | Lambert | ............... | B60R 16/02 296/24.34 |
| 8,816,636 B2 * | 8/2014 | Shinde | ............... | B60R 7/04 307/104 |
| 9,143,587 B2 * | 9/2015 | Lachnitt | ............... | H04M 1/0202 |
| 9,350,839 B2 * | 5/2016 | Lachnitt | ............... | H04M 1/04 |
| 9,403,490 B2 * | 8/2016 | LaFargue | ............... | B60R 11/0241 |
| 9,432,071 B2 * | 8/2016 | An | ............... | H04B 1/3877 |
| 9,455,595 B2 * | 9/2016 | Jeon | ............... | H02J 7/025 |
| 9,469,253 B2 * | 10/2016 | Brunard | ............... | B60R 11/02 |
| 2002/0100782 A1 * | 8/2002 | Marvin | ............... | B60R 11/0241 224/483 |
| 2003/0128840 A1 | 7/2003 | Luginbill et al. | | |
| 2007/0045495 A1 * | 3/2007 | Asano | ............... | H04M 1/04 248/309.1 |
| 2011/0156637 A1 * | 6/2011 | Thorsell | ............... | B60N 3/002 320/108 |
| 2011/0272959 A1 | 11/2011 | Lupton, III et al. | | |
| 2013/0258604 A1 | 10/2013 | Quijano | | |

FOREIGN PATENT DOCUMENTS

| | | | | |
|---|---|---|---|---|
| WO | 2007/084316 A2 | | 7/2007 | |
| WO | 2009/043367 A1 | | 4/2009 | |
| WO | WO 2015057855 A1 * | | 4/2015 | ............ B60R 11/00 |

OTHER PUBLICATIONS

International Search Report for International Application No. PCT/US2015/044074 dated Nov. 5, 2015.

* cited by examiner

MOBILE DEVICE HOLDER FOR USE IN A VEHICLE

CROSS REFERENCE TO RELATED APPLICATIONS

The present application is a continuation of International Application No. PCT/US15/44074 titled "MOBILE DEVICE HOLDER FOR USE IN A VEHICLE" filed Aug. 6, 2015.

The present application claims priority from and the benefit of and incorporates by reference in entirety of the following applications: (a) International Application No. PCT/US15/44074 titled "MOBILE DEVICE HOLDER FOR USE IN A VEHICLE" filed Aug. 6, 2015; (b) U.S. Provisional Patent Application No. 62/033,923 titled "MOBILE DEVICE HOLDER FOR USE IN A VEHICLE" filed Aug. 6, 2014.

FIELD

The present invention relates to a vehicle interior component. The present invention also relates to a vehicle console assembly. The present invention also relates to a vehicle console assembly with a mobile device holder. The present invention further relates to a mobile device holder for use in a vehicle.

BACKGROUND

It is well-known to provide a console assembly within the interior of a vehicle. It is also known to provide a mobile device holder within a vehicle console assembly. It is also known to provide a mobile device holder for holding a single mobile device. It is known to provide a vehicle console assembly with a compartment and a cover member that selectively covers the compartment. It is known to include a mobile device holder within the compartment of the vehicle console assembly.

It would be advantageous to provide a vehicle console assembly with an improved mobile device holder. It would also be advantageous to provide an improved mobile device holder for use in a vehicle. It would further be advantageous to provide a mobile device holder for use in a vehicle formed into the cover member of the compartment that can hold multiple mobile devices and that can include a storage location for cables connectable to the multiple mobile devices.

SUMMARY

The present invention relates to a console for a vehicle interior configured to position a first mobile device connectable by a first cable and a second mobile device connectable by a second cable. The console may comprise a base providing a compartment; a cover for the compartment comprising a cradle and movable from a closed position to an open position; wherein the cradle is configured to hold the first mobile device and the second mobile device when the cover is in the open position. The console may comprise a spring configured to bias the cover toward the open position and a latch configured to latch the cover to the base in the closed position. The cover may be pivotally connected to the base and an underside of the cover may be exposed when the cover is in the open position. The cradle may be configured to provide at least one opening for the first cable or the second cable; the cradle may comprise at least one of (a) a shelf; (b) a ledge; and (c) a ledge with a curved profile. The base may comprise a port within the compartment configured to provide at least one of electrical power and data. The cover may comprise a slip resistant surface on at least one of the underside of the cover and the cradle and wherein the slip resistant surface is configured to support a rear surface of the mobile device when the cover is in the open position. The slip resistant surface may comprise at least one of (a) a soft cushion; (b) a coating; (c) an overmold; (d) a cushion; (e) rubber; (f) felt; (g) leather; (h) a soft material; and (i) a high friction material. The first mobile device may include a first thickness; the second mobile device may include a second thickness greater than the first thickness; the cradle may comprise a curved profile configured to accommodate the first thickness and the second thickness.

The present invention relates to a console for a vehicle interior configured to position at least one mobile device connectable by a cable. The console may comprise a base providing a compartment; a cover for the compartment comprising a cradle and movable to an open position; a bin comprising an opening configured to provide storage for at least a portion of the cable connectable to at least one mobile device; and a cover for the bin. The cradle may be configured to support at least one mobile device. The cover for the bin may be configured to facilitate access for the cable in the bin; the cover for the bin may comprise a sheet; the cover for the bin may comprise at least one flexible portion configured to provide an opening for the cable. The cover for the bin may comprise at least one of (a) a flexible sheet; (b) a stretchable sheet; (c) a deformable sheet; (d) an elastomer sheet; (e) a bin cover; (f) a member; (g) a cover member. The cover for the bin may be clamped between the bin and the base; the cover for the bin may comprise a slit to provide access to the bin; the cover for the bin may comprise at least one flap configured to deflect to at least partially uncover the bin.

The present invention relates to a console for a vehicle interior configured to position at least one mobile device connectable by a cable to a port. The console may comprise a base providing a compartment; a cover for the compartment comprising a cradle and movable to an open position; a bin adjacent the compartment configured to provide storage for at least a portion of the cable; and a cover for the bin. The cradle is configured to support at least one mobile device. The compartment may be configured to provide the port for connection to at least one of electrical power and data. The cover for the bin may be positioned between the compartment and the bin; the cover for the bin may provide a floor for the compartment; the cover for the bin may comprise a slit configured to deflect to provide access to the bin.

The present invention also relates to a vehicle console assembly for a vehicle interior. The console includes a mobile device holder that may comprise a base with a compartment and compartment opening and a cover configured to selectively cover the compartment opening. The cover may comprise an underside and one or more cradles extending from the underside. The cradles may be configured as a shelf or ledge and may include a curved profile. The cradles may be configured to hold at least one mobile device against the underside of the cover. The cover may further include one or more openings extending between or through the cradles to allow a cable to be connectable to a mobile device positioned on the cradles. The cover may further comprise a surface configured on the underside and cradles of the cover that has slip-resistant properties to assist in keeping the mobile device retained on the cradles and against the underside of the cover.

The present invention also relates to a mobile device holder configured in a vehicle console. The cover may be configured to move between a closed position where the cover covers the compartment opening and an open position where the underside of the cover and the one or more mobile devices positioned on the cradles are displayed to occupant(s) in the vehicle. The cover may be pivotably connected to the base to allow the cover to pivot between the open position and the closed position. The mobile device holder may further comprise a spring configured for biasing the cover toward the open position when unrestrained. The mobile device holder may further include a latch for securing the cover in the close position. The latch may be configured to be selectively released to allow the cover to pivot to the open position.

The present invention further relates to a mobile device holder configured in a vehicle console. The mobile device holder may comprise at least one electrical port positioned within the compartment and configured as an electrical and/or electrical port. The electrical port may allow a mobile device provided on the cover to be connectable by a cable extending through the openings in the cradles of the cover.

The present invention further relates to a mobile device holder configured in a vehicle console. The mobile device holder may comprise a bin provided beneath the compartment and next to the electrical port. The bin may comprise an opening with storage space for storing at least a portion of a cable connectable to a mobile device provided on the cover and the electrical port. The bin may include a bin cover member. The bin cover member may comprise a sheet. The sheet may be configured as a flexible and/or deformable sheet. The sheet may include one or more slits defined into the sheet. The slits may provide one or more flaps on the sheet that may be elastically deformed to provide access to the bin.

The present invention further relates to a mobile device holder configured in a vehicle console. The mobile device holder may comprise cover with a cradle configured for holding and displaying a first mobile device and a second mobile device. The cradle may comprise a ledge with a curved profile for accommodating the thickness of the first mobile device and the thickness of the second mobile device, where the thickness of the second mobile device is greater than the thickness of the first mobile device.

An apparatus configured to position at least one mobile device connected by a cable for use in a vehicle interior includes a base providing a compartment and a cover for the compartment movable to an open position providing a cradle for at least one mobile device. The cradle is provided on an underside of the cover.

A console for a vehicle interior configured to position at least one mobile device connectable by a cable for use in the vehicle interior includes a base providing a compartment, a cover for the compartment movable to an open position providing a cradle for the mobile device, and a bin configured to provide storage for the cable and a cover for the bin.

Other features and aspects of the invention will become apparent by consideration of the following detailed description and accompanying drawings.

FIGURES

DESCRIPTION

Figure 1:
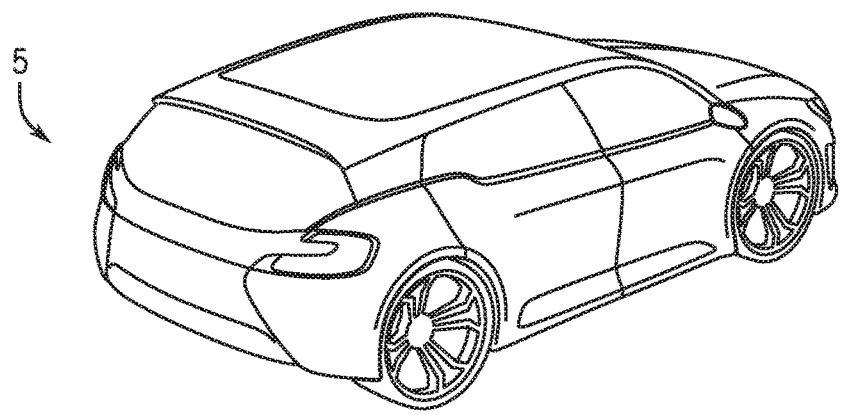
FIG. 1 is a schematic perspective view of a vehicle according to an exemplary embodiment.
Figure 2:
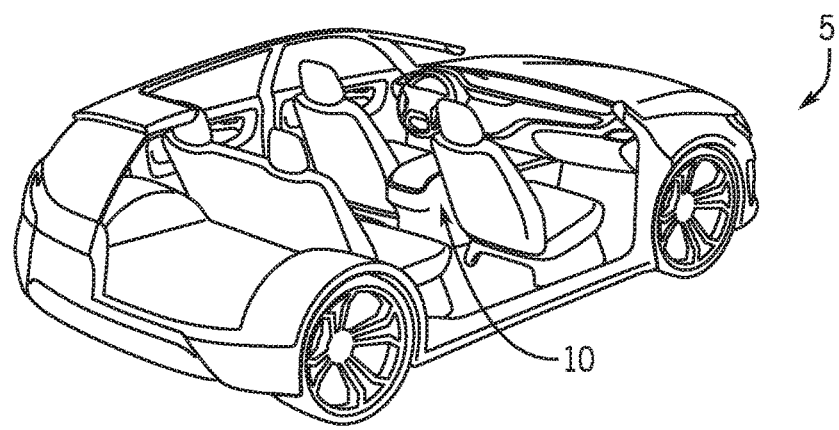
FIG. 2 is a schematic perspective view of a vehicle interior with a vehicle console according to an exemplary embodiment.
Figure 3:
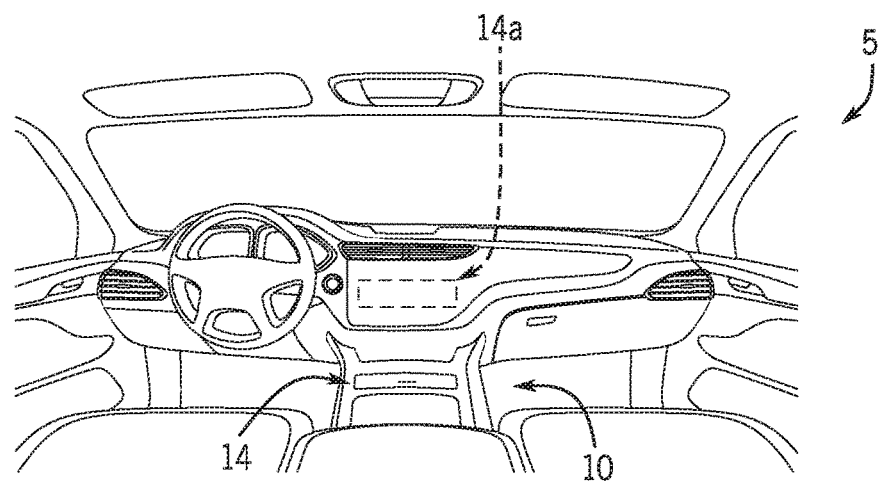
FIG. 3 is a schematic perspective view of a vehicle interior with a vehicle console according to an exemplary embodiment.

Referring to FIGS. 1 and 2, a vehicle 5 including a vehicle console 10 located in the interior of the vehicle 5 is shown schematically according to an exemplary embodiment. Referring to FIG. 3, the console 10 includes a mobile device holder 14 for allowing an occupant in the vehicle 5 to position, display and/or store at least one mobile device 18.

Figure 4A:
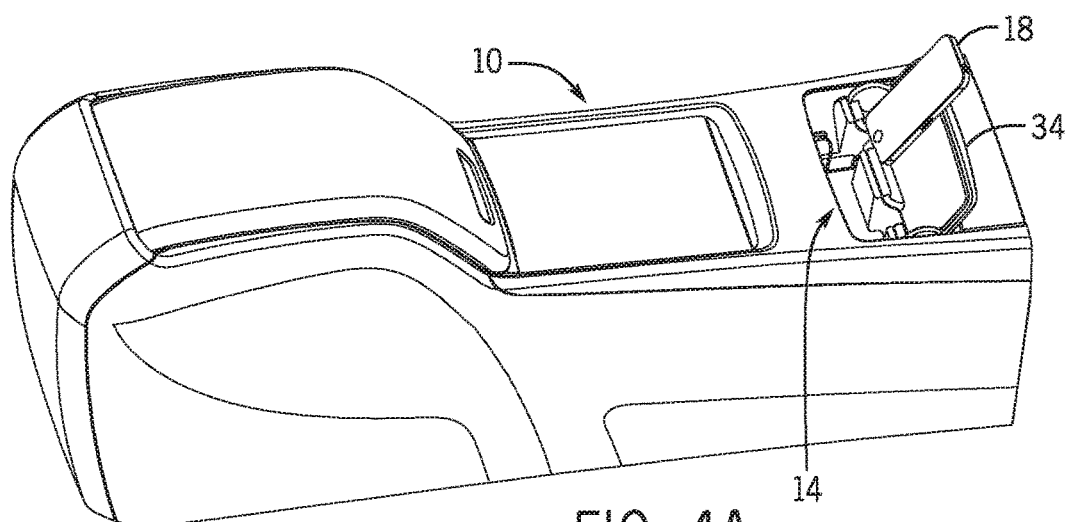
FIG. 4A is a schematic perspective view of a vehicle console with a mobile device holder according to an exemplary embodiment.
Figure 4B:
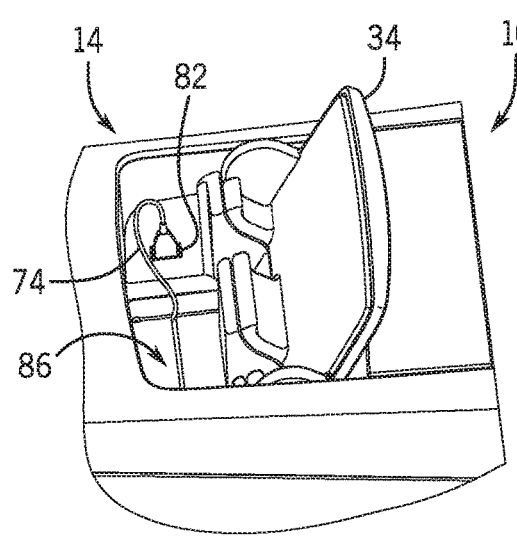
FIG. 4B is a schematic perspective view of a vehicle console with a mobile device holder showing a cover for the mobile device holder in an open position according to an exemplary embodiment.
Figure 4C:
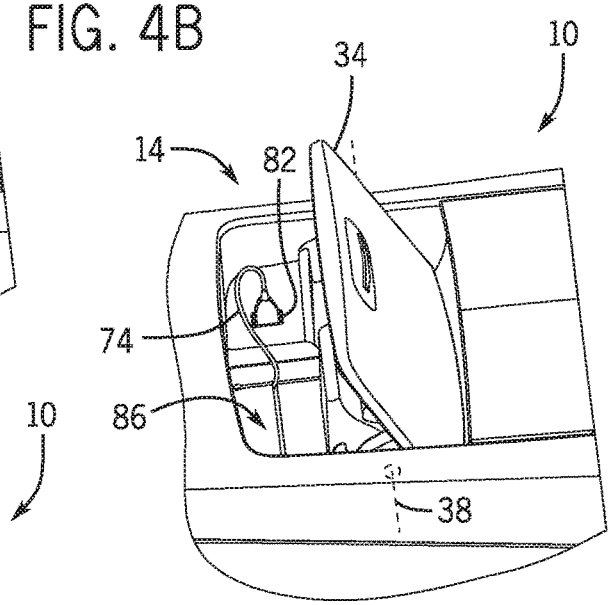
FIG. 4C is a schematic perspective view of a vehicle console with a mobile device holder showing a cover for the mobile device holder in a partially closed position according to an exemplary embodiment.
Figure 4D:
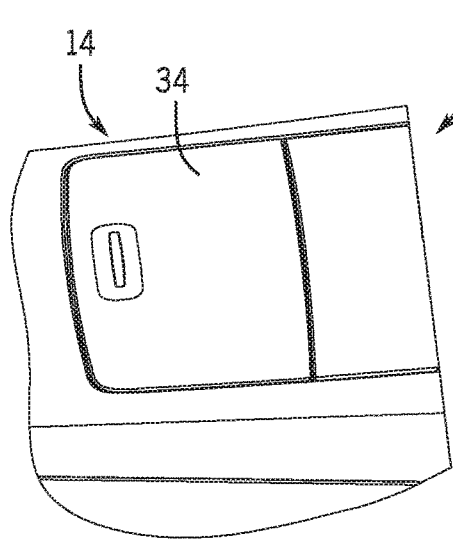
FIG. 4D is a schematic perspective view of a vehicle console with a mobile device holder showing a cover for the mobile device holder in a closed position according to an exemplary embodiment.
Figure 5:
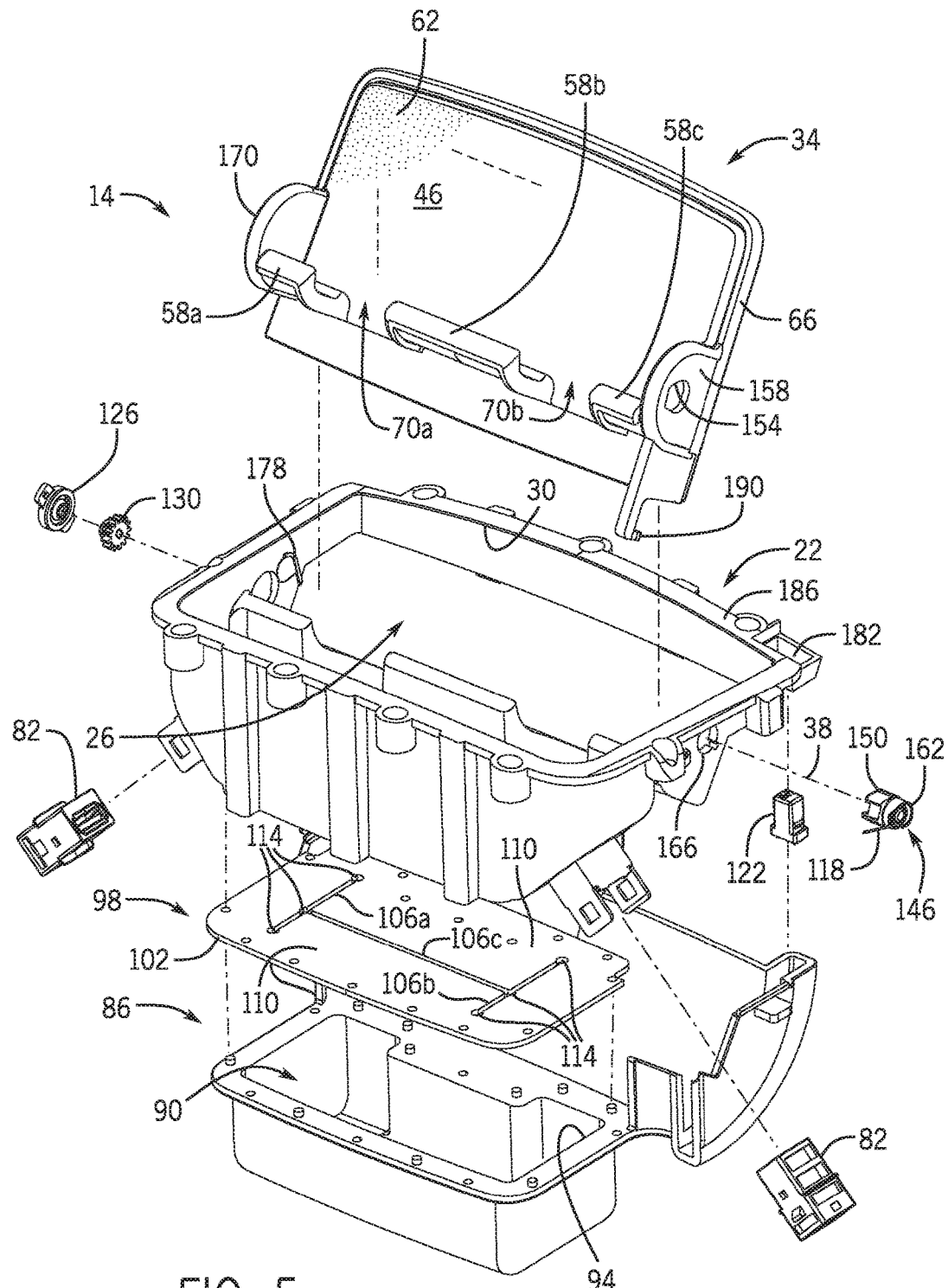
FIG. 5 is a schematic exploded view of a mobile device holder according to an exemplary embodiment.
Figure 6:
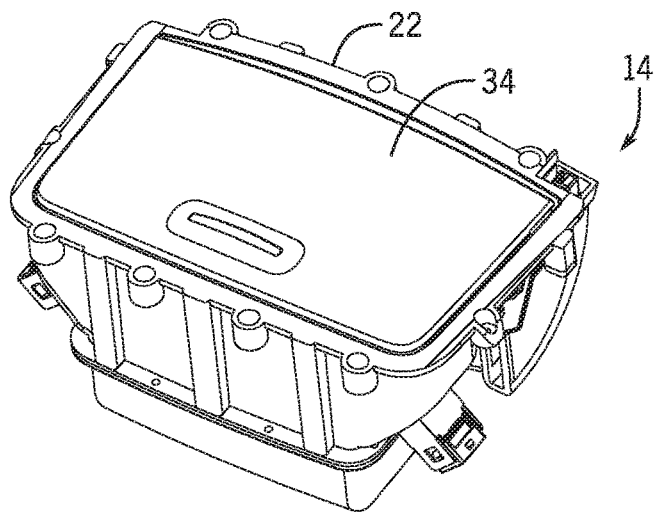
FIG. 6 is a schematic perspective view of a mobile device holder showing a cover in a closed position according to an exemplary embodiment.

As shown schematically in FIG. 5, the mobile device holder 14 may comprise a base 22 having a compartment 26 and an opening 30 for accessing the compartment 26. Mobile device holder 14 may comprise a cover 34 for at least partially covering the compartment 26 and opening 30. The cover 34 may be configured to move between an open position and a closed position according to an exemplary embodiment. As shown schematically in FIGS. 4A-4D, the cover 34 may be pivotally connected to the base 22 to allow the cover 34 to pivot between the open position (FIGS. 4A and 4B) and the closed position (FIG. 4D). When in the closed position, the cover 34 may be configured to hold and store the mobile device 18; when in the closed position, the cover 34 may cover the opening 30 of the compartment 26 and may be positioned generally flush with the surrounding exterior sides of the compartment 26 according to an exemplary embodiment. See FIGS. 4D, 6 and 10A; when in the open position, the cover 34 may be configured to hold and display the mobile device 18 according to an exemplary embodiment. See FIGS. 4A and 12-17. As shown schematically in FIGS. 4B and 5, according to an exemplary embodiment, when the cover 34 is in the open position, the interior surface or underside 46 of the cover 34 becomes exposed to the occupant(s) in the vehicle 5 and the compartment 26 becomes accessible.

As shown schematically in FIG. 5, the cover 34 may comprise structure shown as one or more cradles 58a-58c extending from the underside 46 of the cover 34 according to an exemplary embodiment; the cradles 58a-58c may be positioned along the lower portion of the cover 34 and extend in an inward direction toward the compartment 26. As shown schematically in FIG. 5, according to an exemplary embodiment, the cradles 58a-58c are configured as a shelf or ledge with an upward-turned terminal edge or a ledge with a curved profile. As shown schematically in FIGS. 16-19, the cradles 58a-58c may be configured to hold one or more mobile devices 18 and 18a, which may be placed on the cradles 58a-58c and against the underside 46 of the cover 34. According to an exemplary embodiment, the cradles 58a-58c may include a curved profile and depth configured to accommodate different mobile devices 18 having different thicknesses. As shown schematically in FIG. 7, cradles 58a-58c may have a depth D between the underside 46 of the cover 34 and the upward curved edge of the cradles 58a-58c that may allow the cover 34 to hold (e.g. simultaneously) a first mobile device 18 having first thickness and a second mobile device 18 having a second thickness in either a stacked arrangement or side-by-side arrangement.

As shown schematically in FIG. 5 according to an exemplary embodiment, the cover 34 includes a slip-resistant surface or cushion 62 positioned over the underside 46 of the cover 34 and/or the cradles 58a-58c; the slip-resistant surface 62 may comprise a cushion, coating or overmold that provides grip-enhancement and slip-resistant properties to the underside 46 of the cover and the cradles 58a-58c. According to an exemplary embodiment, the slip-resistant surface 62 may be constructed from one or more of rubber, felt, leather, a soft material and a high friction material (or other suitable materials); the slip-resistant surface 62 may enhance the retention of the one or mobile devices 18 when placed on the cover 34 and support a rear surface of the mobile devices 18 (e.g. enhancing friction, holding, etc.) when the cover 34 is in the open position.

Figure 13:
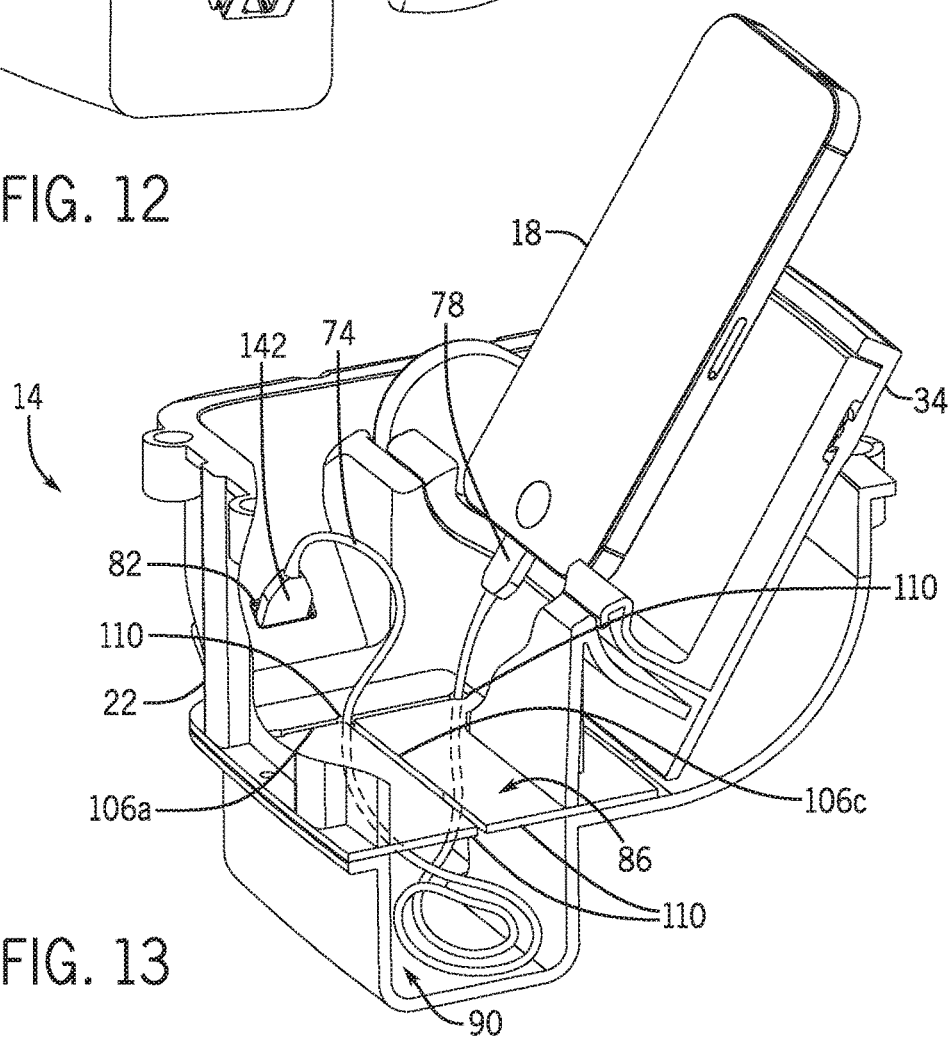
FIG. 13 is a schematic cross-section perspective view of a mobile device holder holding a mobile device according to an exemplary embodiment.

As shown schematically in FIGS. 5 and 13 according to an exemplary embodiment, the cover 34 may include one or more openings 70a and 70b. As shown schematically in FIGS. 5 and 13, the openings 70a and 70b may be provided between or located through the cradles 58a-58c; the openings 70a and 70b may be provided to allow a cable 74 to be connected to the mobile device 18. As shown schematically in FIGS. 5 and 18, according to an exemplary embodiment, the cover 34 may include a first opening 70a between the cradles 58a and 58b and a second opening 70b between the cradles 58b and 58c to allow a first cable 74 to be connected to a first mobile device 18 and a second cable 74 to be connected to a second mobile device 18a. As shown schematically in FIGS. 18-20, the console 10 and the mobile device holder 14 may include a cover 34 configured for holding a first mobile device 18 connectable by a first cable 74 and a second mobile device 18a connectable by a second cable 74.

As shown schematically in FIG. 5 according to an exemplary embodiment, the mobile device holder 14 may include at least one port 82 (e.g. for electrical, data, charging, connection, etc.) located within the compartment 26 of the base 22. The port(s) 82 may be a data port, such as a USB port, and/or an electrical power port (or other port) and can be configured for connecting the one or more mobile devices 18 via cables 74.

As shown schematically in FIGS. 5 and 7-9 according to an exemplary embodiment, the mobile device holder 14 may include a cable organizer 86 configured for holding and storing the one or more cables 74. The cable organizer 86 may be located next to ports 82 and beneath cover 34. As shown schematically in FIGS. 7-9, according to an exemplary embodiment, the cable organizer 86 comprises a bin 90 located beneath the base 22 and the compartment 26 and configured for holding at least a portion of the cable or cables 74. As shown schematically in FIGS. 5 and 7-9, according to an exemplary embodiment, the bin 90 may include an opening 94 that may be covered by a cover 98 (e.g. cover, cover member) configured for restricting access to the bin 90 and obstructing the vehicle occupant's view into the bin 90. The cover 98 may create a floor for the compartment 26. As shown schematically in FIG. 5, according to an exemplary embodiment, the cover 98 may comprise a sheet 102 that extends between the base 22 and the bin 90. According to an exemplary embodiment, the sheet 102 is clamped between the base 22 and the bind 90. According to an exemplary embodiment, the sheet 102 may be a flexible, stretchable, deformable and/or elastomer sheet 102 that can provide a flexible portion of cover 98. As shown schematically in FIG. 5, according to an exemplary embodiment, the sheet 102 may include one or more slits 106a-106c configured to allow access to the bin 90. As shown schematically in FIGS. 8 and 9, the slits 106a-106c may create one or more flaps 110 that can deform and/or deflect (e.g. elastically fold, deflect, bend, deform) to provide access to bin 90 and to allow cable 74 to be inserted into and removed from the bin 90.

As shown schematically in FIG. 5, the mobile device holder 14 may include a spring 118 configured for biasing the cover 34 toward the open position. According to an exemplary embodiment, the spring 118 comprises a torsion spring incorporated into a spring assembly 146 that connects the cover 34 to the base 22. The spring 118 may be biased in the direction of the open position of the cover 34 so that when the cover 34 is unrestrained, the cover 34 rotates to the open position.

Figure 10A:
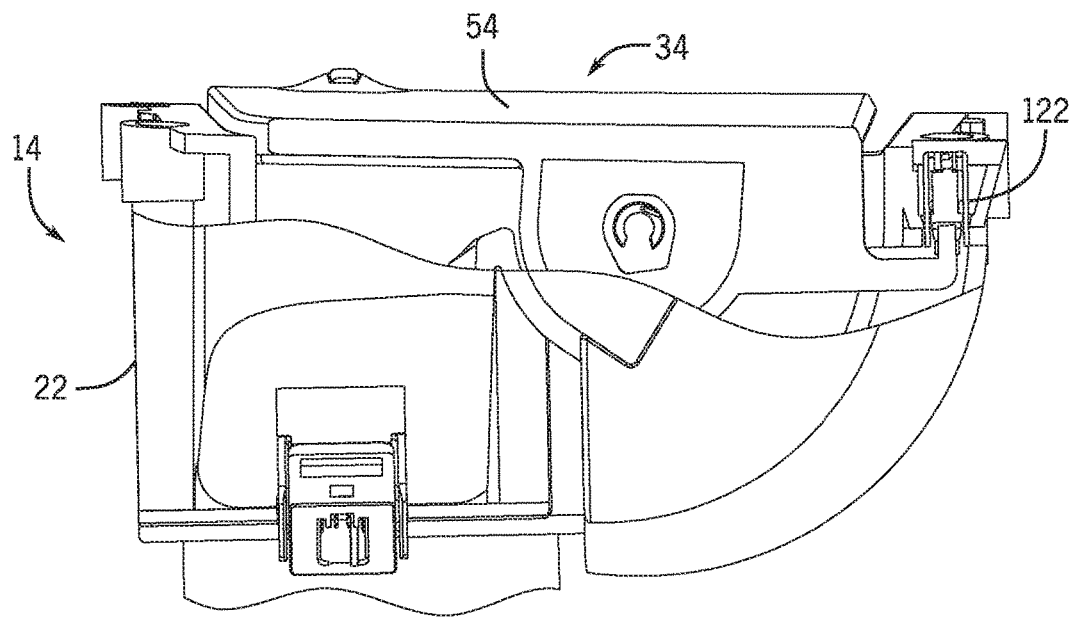
FIG. 10A is a schematic side view of a mobile device holder showing a cover of the mobile device holder in a closed position according to an exemplary embodiment.
Figure 10B:
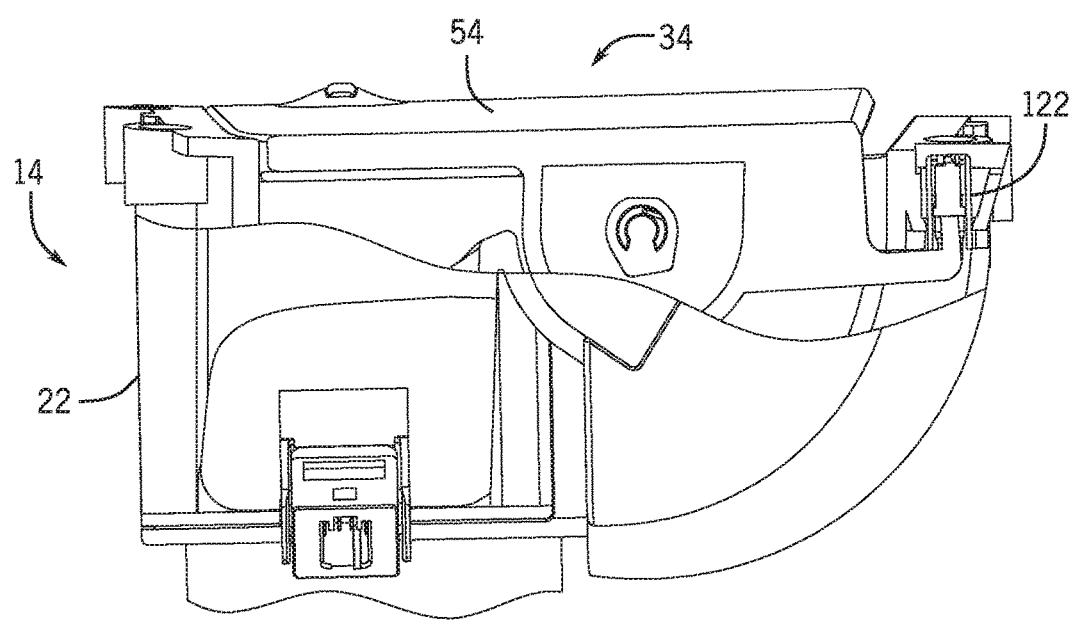
FIG. 10B is a schematic side view of a mobile device holder showing a cover of the mobile device holder being depressed to release a latch of the mobile device holder according to an exemplary embodiment.

As shown schematically in FIGS. 5, 10A and 10B, the mobile device holder 14 may include a latch 122 configured for securing the cover 34 in its closed position. According to an exemplary embodiment, the latch 122 connects the cover 34 to the base 22 so that the spring 118 is prevented from biasing the cover 34 toward the open position. As shown schematically in FIGS. 10A and 10B, the latch 122 may be located along the side of the cover 34 and positioned away from the pivot axis of the cover 34. When the latch 122 is released, the cover 34 may rotate from the closed position to the open position as a result of the spring 118 biasing the cover 34. As shown schematically in FIG. 10B according to an exemplary embodiment, the latch 122 can be configured to be released when the cover 34 is depressed.

According to an exemplary embodiment, a console 10 for a vehicle interior is provided where the console comprises (a) a base 22 having a compartment 26, and (b) a cover 34 connected to the base 22 and configured for displaying a first mobile device 18 connectable by a cable 74 and a second mobile device 18a connectable by a cable 74 against an underside 46 of the cover 34 and on a cradle 58 provided on the cover 34. See FIGS. 4A and 18-20. According to an exemplary embodiment, the cover 34 is configured for being movable between a closed position where the cover 34 covers the compartment 26 and an open position where the cover 34 is configured for displaying the mobile devices 18 and 18a on the underside 46 and cradle 58 provided on the cover. See FIGS. 4B-4D. According to an exemplary embodiment, the console 10 comprises a spring 118 connected to the cover 34 and the base 22 and configured for biasing the cover 34 toward the open position. See FIG. 12. According to an exemplary embodiment, the cover 34 is pivotally connected to the base 22 and configured for exposing the underside 46 and cradle 58 of the cover 34 when in the open position. See FIG. 5. According to an exemplary embodiment, the console 10 includes at least one opening 70 in the cradle 58 for allowing the mobile devices 18 and 18a to be connectable to the cable or cables 74. See FIGS. 5 and 13. According to an exemplary embodiment, the cradle 58 is configured as at least one of a shelf, a ledge and a ledge with a curve profile. See FIG. 5. According to an exemplary embodiment, the console 10 includes an electrical port 82 provided in the compartment 26, where the port 82 is configured for providing electrical power and/or data. See FIG. 7. According to an exemplary embodiment, the cover 34 includes a slip resistant surface provided on the cradle 58 and/or the underside 46 of the cover 34. See FIG. 5.

According to an exemplary embodiment, a console 10 for a vehicle interior is provided where the console 10 comprises (a) a base 22 with a compartment 26, (b) a cover pivotally connected to the base 22 and configured for holding and displaying at least one mobile device 18 on a cradle 58 when in an open position, (c) a bin 90 with an opening provided beneath the base 22 and configured for storing a portion of a cable 74, and (d) a cover 98 clamped between the bin 90 and the base 22 and providing a floor of the base 22 and obstructing the view of the vehicle occupant into the bin 90. See FIGS. 5, 7 and 13. According to an exemplary embodiment, the cover 98 comprises a sheet 102 configured as a flexible, stretchable, deformable and/or elastomer sheet. According to an exemplary embodiment, the cover 98 includes at least one slit 106 defined through the cover 98 and configured for providing access to the bin 90. See FIGS. 7-9. According to an exemplary embodiment, the at least one slit 106 provides at least one elastically deformable flap 110. See FIGS. 8 and 9.

Exemplary Embodiment

As shown schematically in FIGS. 1 and 2, a vehicle 5 and a vehicle console assembly 10 located on the floor of the vehicle 5 between driver and passenger-side seats. The console assembly 10 includes a mobile device holder 14 (FIG. 4A) for a vehicle occupant to place or display various personal objects, such as a mobile device 18 (e.g., a mobile phone, a tablet computer, etc.) in a desired position and orientation (e.g., portrait or landscape). The mobile device holder 14 may be located elsewhere within the interior of the vehicle 5; the mobile device holder 14 may be incorporated in a dashboard of the vehicle 5 (as shown schematically at 14a in FIG. 3). The mobile device holder 14 may be incorporated in a rear console assembly between driver and passenger-side rear seats, in an overhead console assembly attached to the roof of the vehicle 5, in an armrest of the vehicle 5, or in one or more door panels of the vehicle 5.

As shown schematically in FIG. 5, the mobile device holder 14 includes a base 22 defining an compartment 26 and an opening 30 for accessing the compartment 26, and a support member or cover 34 coupled to the base 22 for selectively closing the opening 30 and supporting the entire weight of the mobile device 18. According to an exemplary embodiment of the mobile device holder 14, the base 22 is a separate component from the surrounding structure of the console assembly 10 and is attached to the surrounding structure of the console assembly 10 during assembly by multiple fasteners. Such fasteners may be configured as conventional threaded fasteners (e.g., screws or bolts), tool-less quick-connect elements (e.g., resilient locking elements), etc. The base 22 may be integrally formed with the surrounding structure of the console assembly 10 as a single piece.

According to an exemplary embodiment of the mobile device holder 14, the cover 34 is pivotably coupled to the base 22 about a pivot axis 38 (FIG. 4C) that is generally transverse to a longitudinal axis of the vehicle 5. The vehicle console assembly 10 and/or the mobile device holder 14 may be reoriented within the interior of the vehicle 5 such that the pivot axis 38 of the cover 34 is oriented coaxial or parallel with the longitudinal axis of the vehicle 5. According to an exemplary embodiment, the mobile device holder 14 may be skewed toward the driver or passenger-side of the vehicle interior, orienting the pivot axis 38 of the cover 34 in an oblique manner to the longitudinal axis of the vehicle 5, to facilitate viewing the mobile device 18 directly or head-on by either the driver or passenger in the front passenger-side seat. The cover 34 may be coupled to the base 22 in another manner providing a degree of freedom other than (or in addition to) pivoting. According to an exemplary embodiment, the cover 34 may be slidable relative to the base 22 rather than being pivotable relative to the base 22.

Figure 11A:
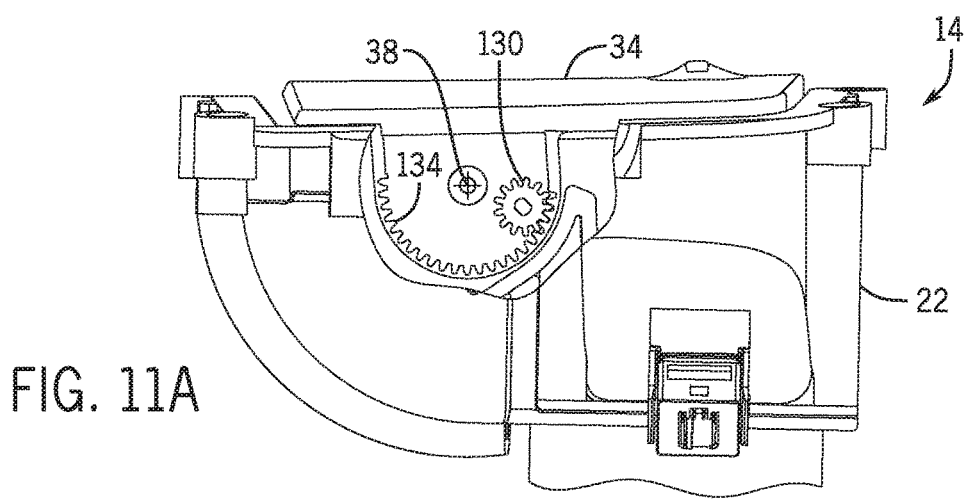
FIG. 11A is a schematic side view of a mobile device holder showing a cover of the mobile device holder in a closed position according to an exemplary embodiment.
Figure 11B:
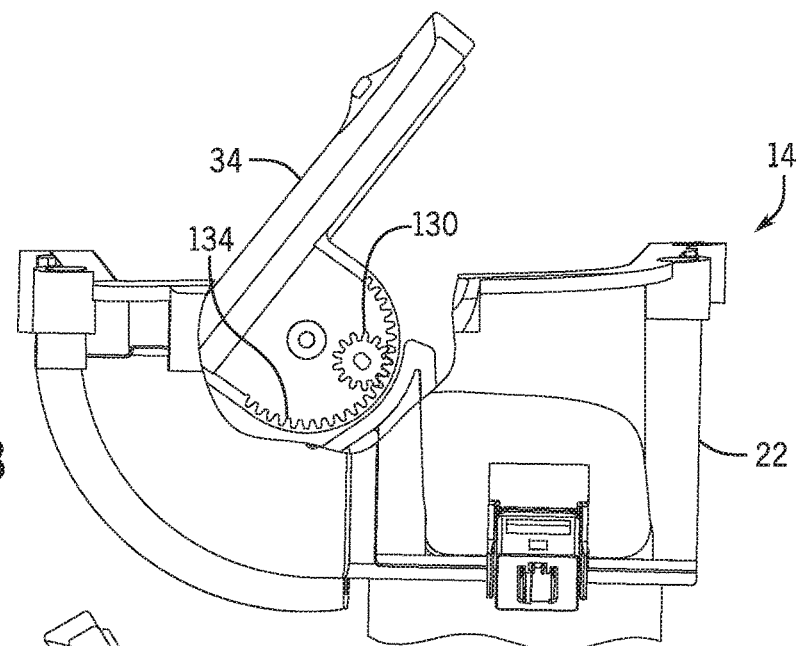
FIG. 11B is a schematic side view of a mobile device holder showing a cover of the mobile device holder between a closed position and an open position according to an exemplary embodiment.

According to an exemplary embodiment, the cover 34 is pivotable between an open position (FIGS. 4A and 4B) in which the compartment 26 of the base 22 is accessible and an interior surface 46 of the cover 34 is oriented at an included angle A (FIG. 11C) with respect to a horizontal plane 50 passing through the console assembly 10 to provide an optimum viewing angle of the mobile device 18 for the occupants of the vehicle 5 to a closed position (FIGS. 4D and 11A) in which the opening 30 is closed and an exterior surface 54 of the cover 34 is generally flush with a surrounding top surface of the console assembly 10. The horizontal plane 50 (FIG. 11C) may extend through the vehicle 5 and may be generally parallel with the ground upon which the vehicle 5 sits. As shown schematically in FIG. 11C, according to an exemplary embodiment of the mobile device holder 14, the included angle A is an oblique angle of about 60 degrees, orienting the mobile device 18 supported upon the cover 34 in an oblique orientation relative to the horizontal plane 50. When the cover 34 is in the open position, the included angle A may be less than about 60 degrees provided that the viewing angle of the mobile device 18 is acceptable to the occupants of the vehicle; when the cover 34 is in the open position, the included angle A may be between about 60 degrees and about 90 degrees to support the mobile device 18 in a more upright orientation relative to the horizontal plane 50. At an included angle A of about 90 degrees the mobile device 18 would be supported upon the cover 34 in an upright orientation relative to the horizontal plane 50.

As shown schematically in FIG. 5, the cover 34 may also include multiple protrusions or cradles 58a-58c extending from the interior surface 46 upon which the mobile device 18 may be placed (see FIG. 4C). To enhance grip on the mobile device 18, the interior surface 46 may be slip-resistant which may be provided by a soft cushion, coating, or overmold (interchangeably referred to as a "cushion 62") applied to a cover substrate 66 (FIG. 5). The cushion 62 may be made from rubber, felt, leather, or another soft and/or high-friction material. According to an exemplary embodiment of the mobile device holder 14, the slip-resistant cushion 62 is applied to the entirety of the underside of the cover substrate 66 including the cradles 58a-58c further enhancing the grip upon the mobile device 18 that can be developed by the cover 34 and reducing the likelihood of damaging (e.g., by scratching, etc.) the mobile device 18 when it is supported by the cover 34. The cushion 62 may be only applied to the cradles 58a-58c or the interior surface 46.

Figure 16:
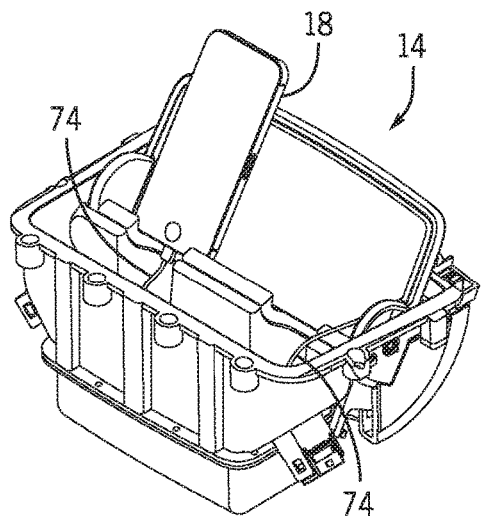
FIG. 16 is a schematic perspective view of a mobile device holder holding a mobile device in a vertical orientation according to an exemplary embodiment.
Figure 17:
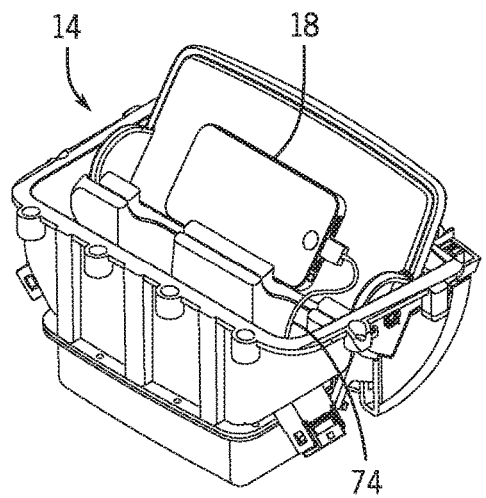
FIG. 17 is a schematic perspective view of a mobile device holder holding a mobile device in a horizontal orientation according to an exemplary embodiment.

As shown schematically in FIG. 5, according to an exemplary embodiment, adjacent cradles 58a, 58b and 58b, 58c define respective openings 70a, 70b through which an attached electrical and/or data cable 74 of the mobile device 18 is insertable (see also FIG. 13). The mobile device 18 may be placed with its bottom end flat on adjacent cradles 58a, 58b or 58b, 58c in a portrait orientation without interference from the cable 74 or a device-end plug 78 of the cable 74. When the mobile device 14 is placed on its side flat on adjacent cradles 58a, 58b in a landscape orientation (FIG. 17), the cable 74 may be routed through the opening 70b. According to an exemplary embodiment of the mobile device holder 14, the cover 34 includes three cradles 58a-58c, a first opening 70a between a first and a second of the cradles 58a, 58b, and a second opening 70b between the second and a third of the cradles 58b, 58c (FIG. 16). The cradle 58b is in the middle of the cover 34 and may be at least twice as wide as the other cradles 58a, 58c, which are located on the extreme left and right sides of the cover 34 respectively. The cover 34 may include any of a number of different cradles 58a-58c and/or openings 70a, 70b in any of a number of different arrangements. The cover 34 may include only a single contiguous cradle spanning substantially the entire width of the cover 34, with or without notches, slots, or reliefs defined therein for placement of a cable 74 attached to the mobile device 18.

Figure 7:
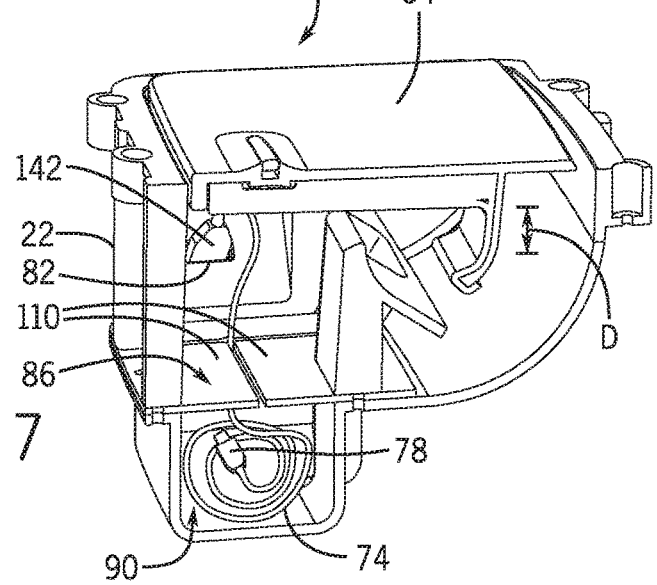
FIG. 7 is a schematic cross-section perspective view of a mobile device holder according to an exemplary embodiment.

According to an exemplary embodiment of the mobile device holder 14, the depth of the cradles 58a-58c is sufficiently large to accommodate mobile devices 18 of different thicknesses and can even accommodate multiple mobile devices 18 in a stacked arrangement (i.e., with at least a second mobile device 18 placed atop and overlying a first mobile device 18 on the cover 34). The depth D of the cradles 58a-58c may be at least about 15 mm (FIG. 7). According to an exemplary embodiment of the mobile device holder 14 (and depending upon the relative size of the vehicle 5 in which the console 10 is incorporated) the depth D of the cradles 58a-58c may be at least about 15 mm to about 25 mm, about 25 mm to about 35 mm, or about 35 mm to about 45 mm. The depth D of the cradles 58a-58c may be about 10 mm or less, and/or can be dimensioned to preclude mobile devices 18 from being stacked one on top of the other upon the cradles 58a-58c.

As shown schematically in FIG. 5, according to an exemplary embodiment, the mobile device holder 14 may also include one or more electrical power and/or data ports 82 (e.g., a USB port) located within the compartment 26 of the base 22. According to an exemplary embodiment, the mobile device holder may also include a cable organizer 86 (see also FIGS. 7-9) located beneath the cover 34 and next to the port 82 and/or between multiple ports 82. The cable organizer 86 may include a bin 90 in which one or more cables 74, or portions thereof, associated with one or more mobile devices 18 supported upon the cover 34 may be stored (FIGS. 4b, 5, and 7-9). According to an exemplary embodiment of the cable organizer 86, the bin 90 includes a U-shaped opening 94 (FIG. 5) overlaid with a cover member 98 for substantially closing the opening 94 and obstructing the vehicle occupants' view into the bin 90. The bin 90 and/or the bin opening 94 may be configured to have any of a number of different shapes to accommodate the dimensions of the console assembly 10. The bin 90 may be shaped to span a substantial width of the base 22 so that multiple cables 74 from multiple mobile devices 18 positioned side-by-side on the cover 34 can be stored in the bin 90.

According to an exemplary embodiment of the cable organizer 86, the cover member 98 is configured as a flexible, stretchable and/or deformable elastomer sheet 102 clamped between the bin 90 and the base 22 (FIG. 5). According to an exemplary embodiment, three slits 106a-106c may be formed in the sheet 102 in an "I" shape, defining opposed flaps 110 that collectively cover the bin opening 94. Two of the slits 106a, 106b are laterally aligned with the respective openings 70a, 70b, while a third of the slits 106c extends transverse to and interconnects the slits 106a, 106b; circular holes 114 having a diameter at least as large as that of the cable 74 may be formed at the ends of each of the slits 106a-106c through which the cable 74 may enter or exit the bin 90 without imparting a residual deflection upon either of the flaps 110. After the middle length of the cable 74 is stored in the bin 90 the opposite ends of the cable 74 may protrude through different holes 114 in the sheet 102 without deflecting the flaps 110. Although two flaps 110 are shown schematically in the exemplary embodiment any other number of flaps 110 may be provided in a suitable arrangement (e.g., a single flap extending substantially the width of the bin 90). The opposed flaps 110 may be in contact with each other to completely close the bin opening 94, and the holes 114 may be omitted. The flaps 110 may be sufficiently flexible to permit access to the different regions of the bin 90 for cleaning. The elastomer sheet 102 may be removable from the base 22 and/or bin 90 to allow unimpeded access to the different regions of the bin 90 for cleaning.

According to an exemplary embodiment, the sheet 102 may be made of a rigid material (e.g., plastic, metal, etc.), and the flaps 110 may be movably coupled to the base 22 and/or the bin 90 in any of a number of different manners (e.g., using a pivoting arrangement, a sliding arrangement, etc.) to allow access into the bin 90 for stowing or removing the cable 74. With such a rigid sheet as the cover member 98, one or more of the flaps 110 may be removed to allow unimpeded access to the different regions of the bin 90 for cleaning. The cover member 98 may be configured as a rigid plate that covers the bin opening 94 and that is removable to allow unimpeded access to the different regions of the bin 90 for cleaning. Such a rigid plate may include one or more apertures through which opposite ends of the cable 74 may protrude for attachment to the port 82 and the mobile device 18 with the remainder of the cable 74 being contained within the bin 90 and shrouded by the rigid plate.

As shown schematically in FIG. 5, according to an exemplary embodiment, the mobile device holder 14 includes a torsion spring assembly 146 coaxial with the pivot axis 38 that biases the cover 34 toward its open position. The torsion spring assembly 146 may include a first connector 150 received within an aperture 154 defined within an ear 158 (e.g. tab or flange) of the cover 34, a second connector 162 received within an aperture 166 defined within a side wall of the base 22, and a torsion spring 118 having a first end affixed to the first connector 150 and a second end affixed to the second connector 162. The outer peripheral shape of the first connector 150 may correspond with the shape of the aperture 154; the first connector 150 may be rotationally constrained to the cover 34. The outer peripheral shape of the second connector 162 may correspond with the shape of the aperture 166 in the base 22; the second connector 162 may be rotationally constrained to the base 22. The first and second connectors 150, 162 may be axially retained to each other; relative rotation between the first and second connectors 150, 162 may be permitted. As the cover 34 is pivoted between the open and closed positions the first connector 150 is rotated relative to the second connector 162, permitting the torsion spring 118 to unwind (when the cover 34 is opening) and wind (when the cover 34 is being closed).

Figure 11C:
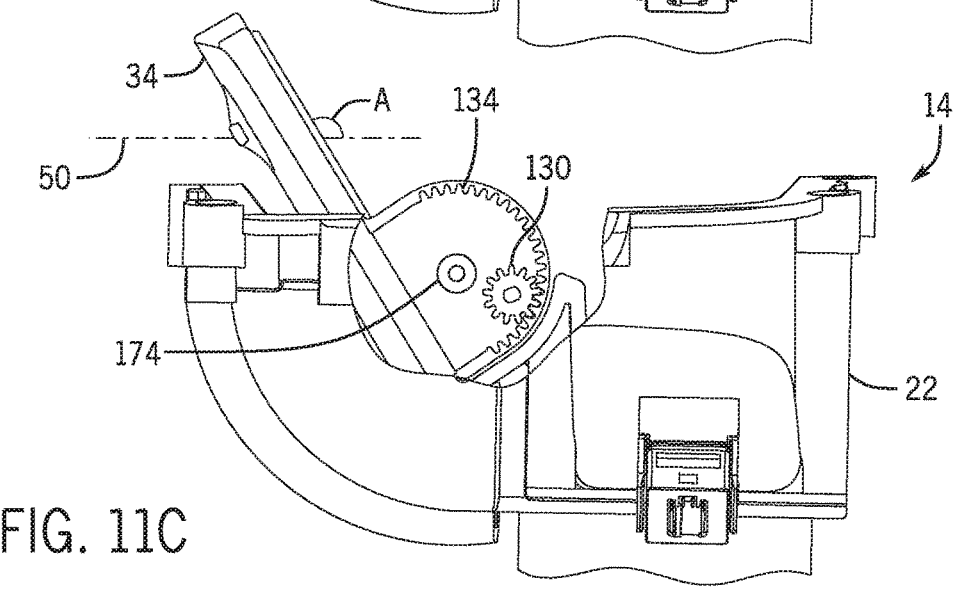
FIG. 11C is a schematic side view of a mobile device holder showing a cover of the mobile device holder in an open position according to an exemplary embodiment.
Figure 12:
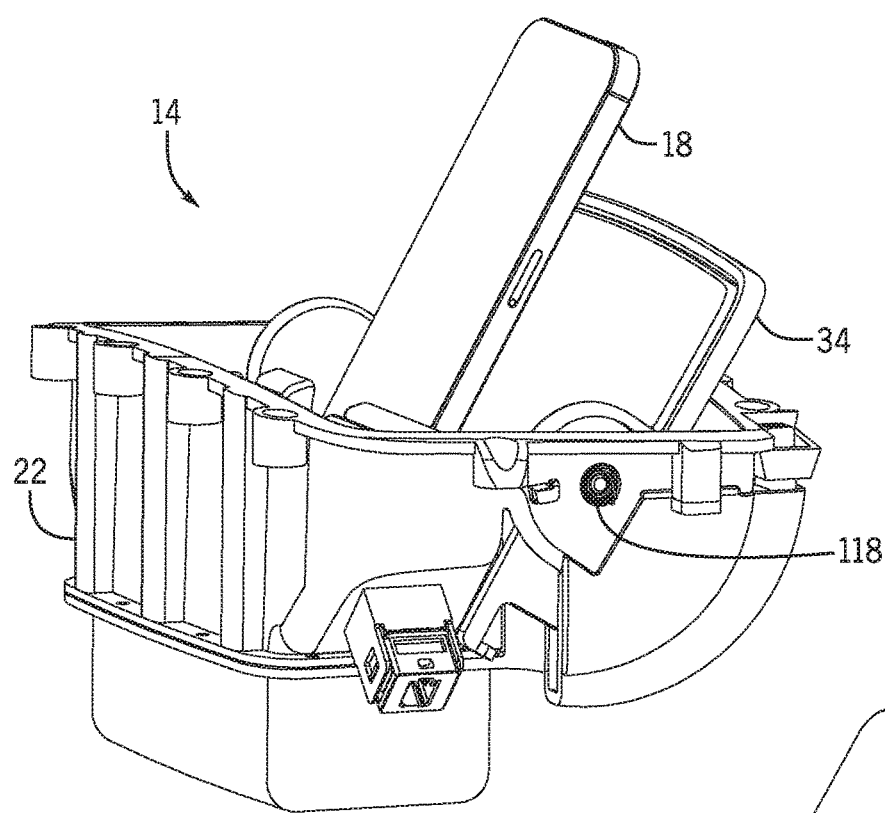
FIG. 12 is a schematic side view of a mobile device holder holding a mobile device according to an exemplary embodiment.

As shown schematically in FIG. 5, according to an exemplary embodiment, (on an opposite side) the cover 34 includes ear 170 (e.g. tab or flange) having a cylindrical protrusion 174 that is coaxial with the pivot axis 38 (FIG. 11C). The protrusion 174 is maintained in engagement with a guide wall 178, a portion of which is arcuate, formed on an opposite side wall of the base 22; the protrusion 174 is slidable against the guide wall 178 as the cover 34 is pivoted between the open and closed positions while remaining coaxial with the pivot axis 38. Any of a number of different features and/or components can be used to pivotably couple the cover 34 to the base 22 about the pivot axis 38.

As shown schematically in FIG. 5, according to an exemplary embodiment, the mobile device holder 14 also includes a latch 122 (e.g., a push-push latch) for securing the cover 34 in its closed position. The latch 122 may be received within a receptacle 182 offset from the pivot axis 38 and defined within a mounting flange 186 of the base 22 (see also FIGS. 10A and 10B). The cover 34 may include a finger 190 (see also FIG. 5) offset from the pivot axis 38 that is engageable with the latch 122 when the cover 34 is secured in the closed position (FIG. 10A). Upon releasing the latch 122 (FIG. 10B), the torsion spring 118 unwinds, applying a torque to the cover 34 in the opening direction. The cover 34 may be biased toward the closed position by the torsion spring 118, and the cover 34 may be lockable in the open position or any number of intermediate positions between the closed and open positions to prevent inadvertent movement of the cover 34 away from a desired position. The mobile device holder 14 may include a push-push latch for locking the cover 34 in an open position, and/or a detent mechanism for holding the cover 34 in one of multiple intermediate positions. Rather than using the separate torsion spring 118 and latch 122, the mobile device holder 14 may include an overcenter spring for biasing the cover 34 toward both the closed position and the open position.

Figure 14:
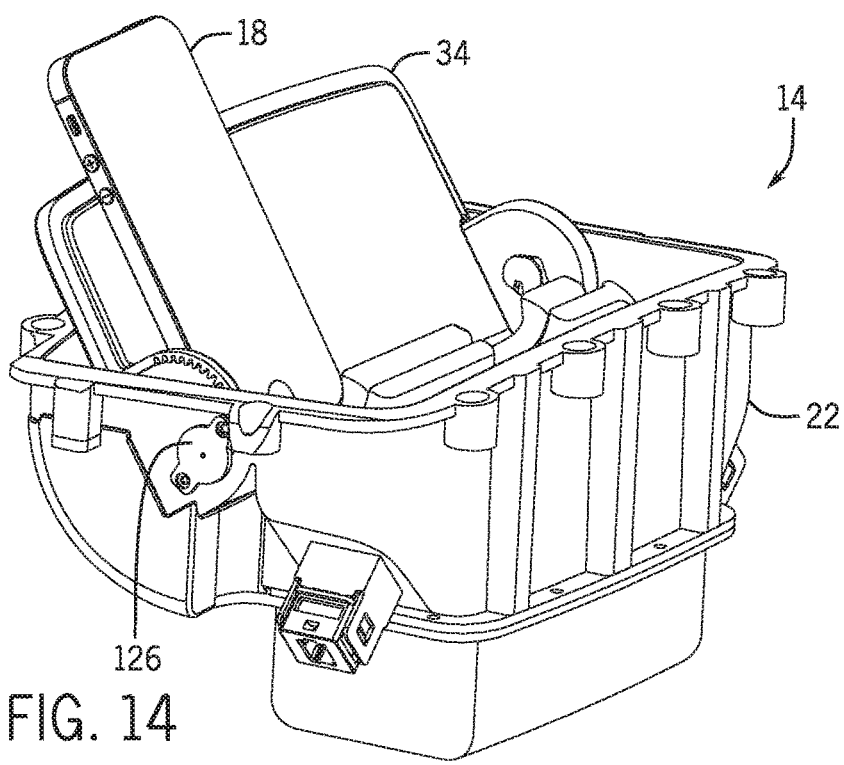
FIG. 14 is a schematic perspective view of a mobile device holder holding a mobile device according to an exemplary embodiment.
Figure 15:
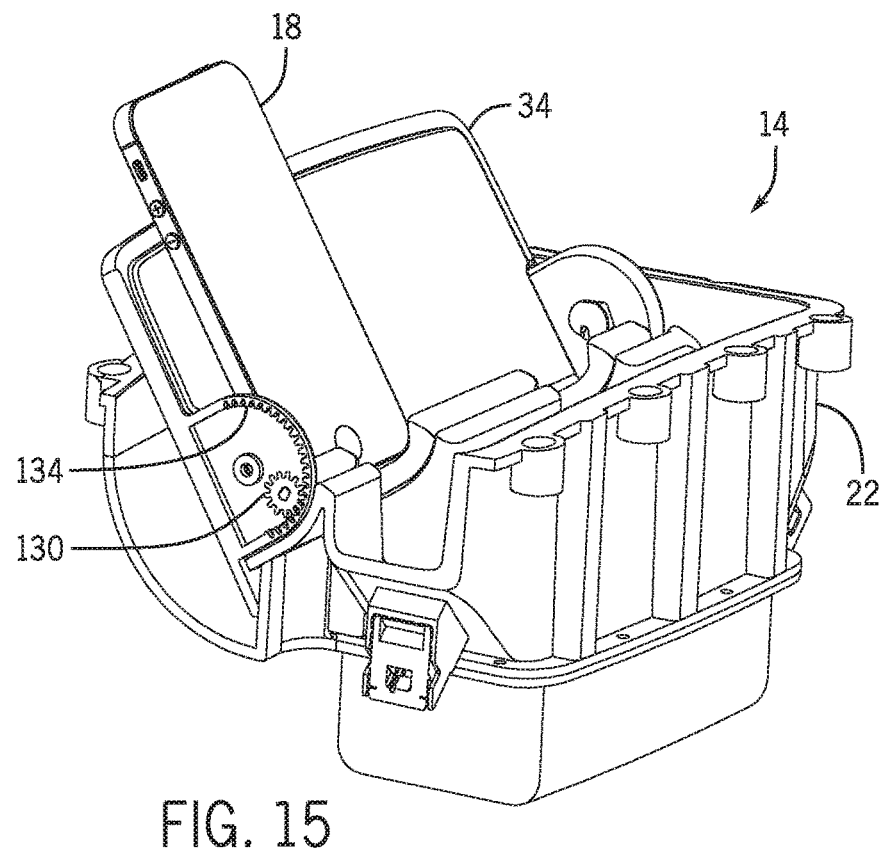
FIG. 15 is a schematic cross-section perspective view of a mobile device holder holding a mobile device according to an exemplary embodiment.

As shown schematically in FIGS. 5 and 14, the mobile device holder 14 may also include a damper 126 for controlling the rotational speed at which the cover 34 is opened. According to an exemplary embodiment of the mobile device holder 14, the damper 126 is configured as a rotary damper 126 including a gear 130 meshed with an arcuate toothed rack 134 formed on the cover 34 (e.g. on the tab or flange) that is concentric with the pivot axis 38 (see also FIGS. 11A-11C and 15). The damper 126 includes a chamber in which a viscous fluid (e.g., oil) is contained and a rotor positioned within the fluid chamber to which the damper gear 134 is coupled for co-rotation. The damper 126 resists abrupt movement of the cover 34 as it is initially opened from the closed position; the damper 126 maintains the rotational speed of the cover 34 at a substantially constant rate as it is opened by the torsion spring 118.

As shown schematically in FIG. 16 according to an exemplary embodiment, a single mobile device 18 is shown schematically placed on the adjacent cradles 58a, 58b in a portrait orientation with the cable 74 attached to the mobile device 18 extending through the opening 70a. A combination of a first and a second of the cradles 58a, 58b can be considered a first portion of the cover 34 upon which the mobile device 18 is supported. If the cable 74 is unattached, the mobile device 18 may be supported in the middle of the cover 34 by the cradle 58b or if the width of the cradles 58a, 58c is about the same as or greater than one-half the width of the mobile device 18 (when viewed in a portrait orientation), the mobile device 18 may be supported on the extreme left or right sides of the cover 34 on the cradle 58a or the cradle 58c. A single mobile device 18 may be placed upon any two adjacent cradles 58a, 58b or 58b, 58c in a landscape orientation (as shown schematically in FIG. 17) with the cable 74 passing through one of the openings 70a, 70b (e.g., the opening 70b as shown schematically in FIG. 17) before passing through one of the holes 114 in the sheet 102. Provided that the length of the mobile device 18 is sufficiently short (when viewed in the landscape orientation) it may be supported in the middle of the cover 34 by only one of the cradles (e.g., the cradle 58b).

Figure 18:
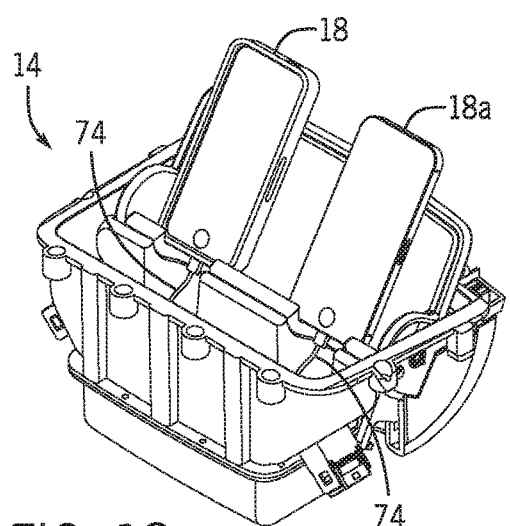
FIG. 18 is a schematic perspective view of a mobile device holder holding two mobile devices in a vertical orientation according to an exemplary embodiment.

As shown schematically in FIG. 18 according to an exemplary embodiment, a second mobile device 18a may be placed on the second and a third of the cradles 58b, 58c side by side with the first mobile device 18 in a portrait orientation, with the cable 74 attached to the mobile device 18a extending through the opening 70b. A combination of the second and third cradles 58b, 58c may be considered a second portion of the cover 34 upon which the second mobile device 18a is supported; both a driver and a passenger of the vehicle 5 may place their respective mobile devices 18, 18a on the cover 34 when it is in the open position and electrically connect the devices 18, 18a to the respective ports 82 for charging and/or data transfer with a system of the vehicle 5.

Figure 19:
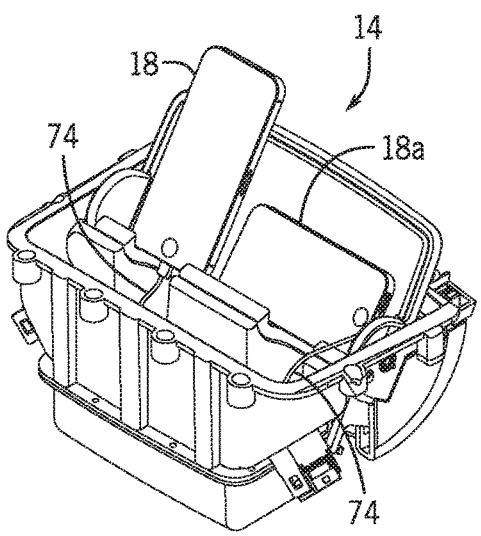
FIG. 19 is a schematic perspective view of a mobile device holder holding two mobile devices, one in a vertical orientation and one in a horizontal orientation, according to an exemplary embodiment.

As shown schematically in FIG. 19, the first and second mobile devices 18, 18a may be placed side by side on the cradles 58a-58c with the mobile device 18 in a landscape orientation and the mobile device 18a in a portrait orientation. A combination of a first and a second of the cradles 58a, 58b may be considered a first portion of the cover 34 upon which the mobile device 18 is supported and a combination of the second and a third of the cradles 58b, 58c can be considered a second portion of the cover 34 upon which the second mobile device 18a is supported. As shown schematically in FIG. 20, the first and second mobile devices 18 18a can be placed side by side on the cradles 58a-58c in a landscape orientation. A combination of a first and a second of the cradles 58a, 58b may be considered a first portion of the cover 34 upon which the mobile device 18 is supported and a combination of the second and a third of the cradles 58b, 58c may be considered a second portion of the cover 34 upon which the second mobile device 18a is supported.

Figure 20:
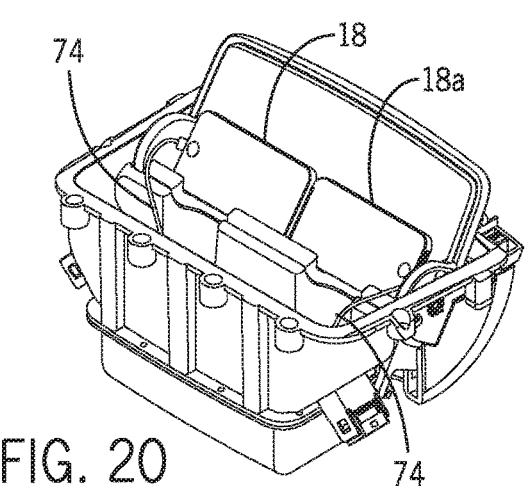
FIG. 20 is a schematic perspective view of a mobile device holder holding two mobile devices in a horizontal orientation according to an exemplary embodiment.

According to an exemplary embodiment, beginning with the cover 34 in the closed position (as shown schematically in FIG. 10A) a user may open the cover 34 by pressing downward on a front portion of the cover 34 to release the latch 122 (FIG. 10B). After the latch 122 is released, the torsion spring 118 unwinds applying a torque to the cover 34 in an opening direction to pivot the cover 34 about the pivot axis 38. As the cover 34 opens, the toothed rack 134 also rotates about the pivot axis 38 (FIGS. 11a-11c) rotating the damper gear 130. The damper 126 applies a reaction torque to the damper gear 134 and the toothed rack 130 in an opposite direction. Pivoting of the cover 34 in the opening direction occurs at a substantially constant and relatively low rotational rate until the cover 34 assumes the open position (FIG. 11C). Once the cover 34 is in the open position, a user may place one or more mobile devices 18, 18a on the cradles 58a-58c of the cover 34 in a portrait or landscape orientation. A single mobile device 18 may be placed on the cover 34 in either a portrait orientation (FIG. 16) or a landscape orientation (FIG. 17); two mobile devices 18, 18a may be placed on the cover 34 side by side in portrait orientations (FIG. 18); two mobile devices 18, 18a may be placed on the cover 34 side by side, one of which in a portrait orientation and the other in a landscape orientation (FIG. 19); two mobile devices 18, 18a may be placed on the cover 34 side by side in landscape orientations (FIG. 20).

According to an exemplary embodiment, the user may plug the cable 74 into the mobile device 18 and the port 82 to establish a data or power connection between the vehicle 5 and the mobile device 18 (see FIG. 4A). Any excess length of the cable 74 may be inserted into the bin 90 of the cable organizer 86 by pushing or stuffing the cable 74 through the flaps 110 which retain the inserted portion of the cable 74 within the bin 90. By tucking the middle portion or excess length of the cable 74 into the cable organizer 86 the overall aesthetic appearance of the console 10 is improved and any interference posed by the cable 74 is reduced when a user interacts with the mobile device 18 and/or the port 82.

Figure 8:
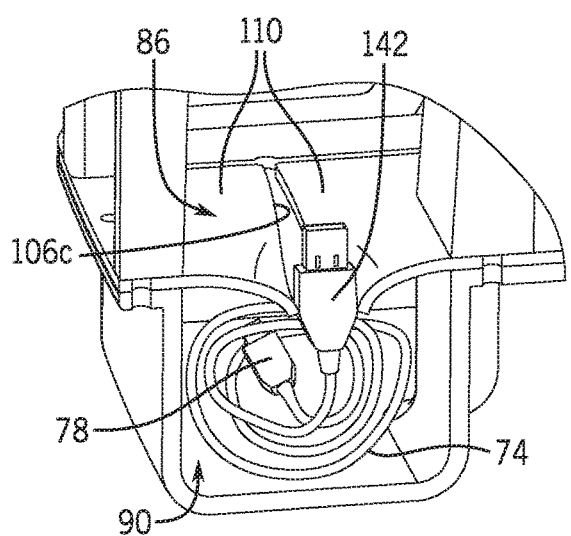
FIG. 8 is a schematic partial cross-section perspective view of a bin for a mobile device holder according to an exemplary embodiment.
Figure 9:
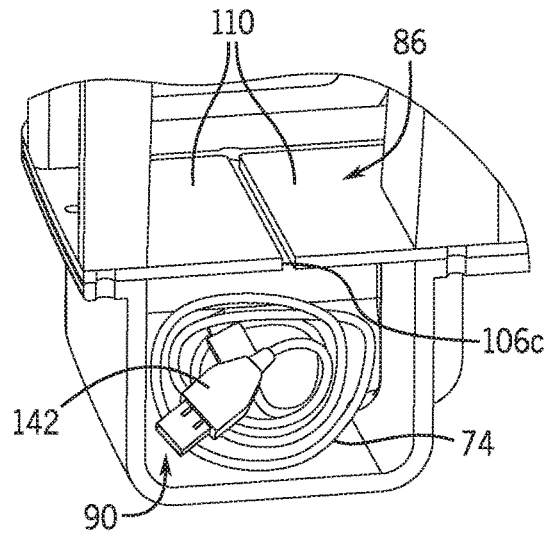
FIG. 9 is a schematic partial cross-section perspective view of a bin for a mobile device holder according to an exemplary embodiment.

According to an exemplary embodiment, if the user decides to remove the mobile device 18 from the device holder 14, the user may disconnect the cable 74 from the mobile device 18 and then push the mobile device-end plug 78 of the cable 74 into the bin 90 for storage (FIGS. 4b and 7). The user may also disconnect a port-end plug 142 of the cable 74 from the port 82 and insert the port-end plug 142 into the bin 90 with the remainder of the cable 74 (FIG. 9). As the port-end plug 142 of the cable 74 is pushed between the flaps 110, the flaps 110 flex downward, effectively enlarging the width of the slit 106b to accommodate the width of the port-end plug 142 (FIG. 8). Afterwards, the user may pivot the cover 34 toward the closed position (FIG. 4C) to cover the cable organizer 86 and the ports 82. Upon reaching the closed position, the latch 122 catches the cover 34 and maintains the cover 34 in the closed position against the bias of the torsion spring 118 (FIG. 4D).

According to an exemplary embodiment, a mobile device holder 14 for use in a vehicle interior includes a base 22, a support member 34 coupled to the base 22 on which a mobile device 18 is supportable in either an oblique orientation or an upright orientation, and a cable organizer 86. The cable organizer 86 includes a bin 90 beneath the support member 34 into which a cable 74 for the mobile device 18 is receivable and a cover member 98 at least partially covering the bin 90.

According to an exemplary embodiment, the cover member 98 may be a flap 110 past which the cable 74 is movable for insertion into the bin 90. The flap 110 may be a first of a plurality of flaps 110 collectively covering the bin 90. According to an exemplary embodiment, the cover 98 may be a rigid plate removably coupled to the base 22. The rigid plate may include a hole through which an attached cable 74 of the mobile device 18 is receivable.

According to an exemplary embodiment, the base 22 may define a compartment 26 and an opening 30 for accessing the compartment 26 and the support member 34 may be a cover 34 for selectively closing the opening 30. The cover 34 may include an interior surface 46 having a cushion 62 or a slip-resistant surface with which the mobile device 18 is in contact and supportable. The interior surface 46 of the cover 34 may define an included oblique angle A with respect to a horizontal plane 50 passing through the base 22 when the cover 34 is in an open position to facilitate viewing the mobile device 18. According to an exemplary embodiment, the cover 34 may be pivotably coupled to the base 22 between an open position in which the mobile device 18 is supportable on the interior surface 46 and a closed position in which the cover 34 closes the opening 30.

According to an exemplary embodiment, the cover 34 may include a cradle 58a-c coupled to the interior surface 46 upon which the mobile device 18 is supportable. The cradle 58a-c may be a first of a plurality of cradles 58a-c coupled to the interior surface 46 of the cover 34, with adjacent cradles 58a, 58b or 58b, 58c defining an opening 70a, 70b through which an attached cable 74 of the mobile device 18 is insertable. A first mobile device 18 may be supportable by a combination of the first and a second of the plurality of cradles 58a, 58b, and a second mobile device 18a may be supportable by a combination of a third and a fourth of the plurality of cradles 58b, 58c. According to an exemplary embodiment, the interior surface 46 of the cover 34 may include a cushion 62 or a slip-resistant surface with which the mobile device 18 is in contact. According to an exemplary embodiment, the interior surface 46 may be flat.

According to an exemplary embodiment, the mobile device holder 14 may include a latch 122 for retaining the support member 34 in a closed position in which the opening 30 is closed; the mobile device holder 14 may include a damper 126 for controlling the support member 34 when opening from a closed position in which the opening 30 is closed.

According to an exemplary embodiment, the support member 34 may include a first portion upon which a first mobile device 18 is supportable in either an oblique orientation or an upright orientation, and a second portion upon which a second mobile device 18a is supportable in either an oblique orientation or an upright orientation; the support member 34 is movable relative to the base 22 between an open position in which the first and second portions are accessible for supporting the respective first and second mobile devices 18, 18a and a closed position in which the first and second portions are inaccessible. The first portion of the support member 34 may be comprised of a first cradle 58a and a second cradle 58b defining a first opening 70a through which an attached cable 74 of the first mobile device 18 is insertable, and the second portion of the support member 34 may be comprised of the second cradle 58b and a third cradle 58c defining a second opening 70b through which an attached cable 74 of the second mobile device 18a is insertable.

According to an exemplary embodiment, a mobile device holder 14 for use in a vehicular interior is provided and comprises a base 22 defining a compartment 26 and an opening 30 for accessing the compartment 26 and a cover 34 coupled to the base 22 for selectively closing the opening 30; the cover 34 includes an interior surface 46 on which a mobile device 18 is supportable in either an oblique orientation or an upright orientation. The mobile device holder 14 may also comprise a cable organizer 86 incorporated in the base 22. The cable organizer 86 may include a bin 90 proximate the cover 34 into which a cable 74 for the mobile device 18 is receivable, and a cover 98 at least partially covering the bin 90. The cover 98 may be a deformable flap 110 past which the cable 74 is movable for insertion into the bin 90. According to an exemplary embodiment, the cover 34 is pivotably coupled to the base 22 between an open position in which the mobile device 18 is supportable on the interior surface 46, and a closed position in which the cover 34 closes the opening 30; the interior surface 46 includes a cushion 62 or a slip-resistant surface with which the mobile device 18 is in contact. According to an exemplary embodiment, a latch 122 is provided for retaining the cover 34 in a closed position in which the opening 30 is closed and a damper 126 is provided for controlling movement of the cover 34 in response to being opened from the closed position. According to an exemplary embodiment, an electrical power port or a data port 82 is provided within the compartment 26 of the base 22.

According to an exemplary embodiment, a mobile device holder 14 for use in a vehicular interior may comprise a base 22, a cover 34 coupled to the base 22 and on which a mobile device 18 is supportable in either an oblique orientation or an upright orientation, and a cable organizer 86 incorporated in the base. The cable organizer 86 may include a bin 90 proximate the cover 34 into which a cable 74 for the mobile device 18 is receivable, and a cover 98 at least partially covering the bin 90. The cover 98 may be a flap 110 past which the cable 74 is movable for insertion into the bin 90. According to an exemplary embodiment, the base 22 defines a compartment 26 and an opening 30 for accessing the compartment 26, wherein the cover 34 selectively closes the opening 30. The cover 34 may include an interior surface 46 on which the mobile device 18 is supportable. According to an exemplary embodiment, an electrical power port or a data port 82 is provided within the compartment 26 of the base 22.

According to an exemplary embodiment, a mobile device holder 14 for use in a vehicular interior is provided and comprises a base 22, and a cover 34 coupled to the base 22 and having a first portion 58a upon which a first mobile device 18a is supportable in either an oblique orientation or an upright orientation, and a second portion 58b upon which a second mobile device 18b is supportable in either an oblique orientation or an upright orientation; the cover 34 is movable relative to the base 22 between an open position in which the first and second portions 58a, 58b are accessible for supporting the respective first and second mobile devices 18a, 18b and a closed position in which the first and second portions 58a, 58b are inaccessible. According to an exemplary embodiment, the first mobile device 18a includes a first thickness; the second mobile device 18b includes a second thickness greater than the first thickness; the first and second portions 58a, 58b of the cover 34 include a thickness at least as large as the second thickness of the second mobile device 18b. The base 22 may define a compartment 26 and an opening 30 for accessing the compartment 26 and the cover can selectively close the opening 30. The cover 34 may include an interior surface 46 on which at least one of the first mobile device 18a or the second mobile device 18b is supportable. According to an exemplary embodiment, an electrical power port or a data port 82 is provided within the compartment 26 of the base 22. According to an exemplary embodiment, a cable organizer 86 is incorporated in the base 22. The cable organizer 86 may include a bin 90 proximate the cover 34 into which a cable 74 of at least one of the first mobile device 18a or the second mobile device 18b is receivable and a cover 98 at least partially covering the bin 90.

The embodiments described and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention as set forth in the appended claims.

It is important to note that the construction and arrangement of the elements of the inventive concepts and inventions as described in this application and as shown schematically in the figures above is illustrative only. Although some embodiments of the present inventions have been described in detail in this disclosure, those skilled in the art who review this disclosure will readily appreciate that many modifications are possible without materially departing from the novel teachings and advantages of the subject matter recited. All such modifications are intended to be included within the scope of the present inventions. Other substitutions, modifications, changes and omissions may be made in the design, operating conditions and arrangement of the preferred and other exemplary embodiments without departing from the spirit of the present inventions.

It is important to note that the apparatus of the present inventions can comprise conventional technology (e.g. as implemented in present configuration) or any other applicable technology (present or future) that has the capability to perform the functions and processes/operations indicated in the FIGURES. All such technology is considered to be within the scope of the present inventions and application.

The invention claimed is:

1. A console for a vehicle interior configured to position a first mobile device connectable by a first cable and a second mobile device connectable by a second cable comprising:
a base providing a compartment;
a cover for the compartment comprising a cradle and movable from a closed position to an open position; and
a spring configured to bias the cover toward the open position and a latch configured to latch the cover to the base in the closed position;
wherein the cradle is configured to hold the first mobile device and the second mobile device when the cover is in the open position.

2. The console of claim 1 wherein the cover is pivotally connected to the base and an underside of the cover is exposed when the cover is in the open position.

3. The console of claim 2 wherein the cover comprises a slip resistant surface on at least one of the underside of the cover and the cradle; and wherein the slip resistant surface is configured to support a rear surface of the mobile device when the cover is in the open position.

4. The console of claim 3 wherein the slip resistant surface comprises at least one of (a) a soft cushion; (b) a coating; (c) an overmold; (d) a cushion; (e) rubber; (f) felt; (g) leather; (h) a soft material; and (i) a high friction material.

5. The console of claim 1 wherein the cradle is configured to provide at least one opening for the first cable or the second cable.

6. The console of claim 1 wherein the cradle comprises at least one of (a) a shelf; (b) a ledge; and (c) a ledge with a curved profile.

7. The console of claim 1 wherein the base comprises a port within the compartment configured to provide at least one of electrical power and data.

8. The console of claim 1 wherein the first mobile device includes a first thickness; wherein the second mobile device includes a second thickness greater than the first thickness; and wherein the cradle comprises a curved profile configured to accommodate the first thickness and the second thickness.

9. A console for a vehicle interior configured to position at least one mobile device connectable by a cable comprising:
a base providing a compartment;
a cover for the compartment comprising a cradle and movable to an open position;
a bin comprising an opening configured to provide storage for at least a portion of the cable; and
a cover for the bin comprising at least one flexible portion configured to provide an opening for the cable;
wherein the cradle is configured to support at least one mobile device; and
wherein the cover for the bin is configured to facilitate access for the cable in the bin.

10. The console of claim 9 wherein the cover for the bin comprises a sheet.

11. The console of claim 9 wherein the cover for the bin comprises at least one of (a) a flexible sheet; (b) a stretchable sheet; (c) a deformable sheet; (d) an elastomer sheet; (e) a bin cover; (f) a member; (g) a cover member.

12. The console of claim 9 wherein the cover for the bin is clamped between the bin and the base.

13. The console of claim 9 wherein the cover for the bin comprises a slit to provide access to the bin.

14. The console of claim 13 wherein the cover for the bin comprises at least one flap configured to deflect to at least partially uncover the bin.

15. A console for a vehicle interior configured to position at least one mobile device connectable by a cable to a port comprising:
a base providing a compartment;
a cover for the compartment comprising a cradle and movable to an open position;
a bin adjacent the compartment configured to provide storage for at least a portion of the cable; and
a cover for the bin;
wherein the cradle is configured to support at least one mobile device; and
wherein the compartment is configured to provide the port for connection to at least one of electrical power and data.

16. The console of claim 15 wherein the cover for the bin is positioned between the compartment and the bin.

17. The console of claim 15 wherein the cover for the bin provides a floor for the compartment.

18. The console of claim 15 wherein the cover for the bin comprises a slit configured to deflect to provide access to the bin.

* * * * *